United States Patent [19]
Russell, Jr. et al.

[11] Patent Number: 5,441,285
[45] Date of Patent: Aug. 15, 1995

[54] SLED ATTACHMENT FOR A CONVENTIONAL CARRYING CART

[76] Inventors: Benjamin E. Russell, Jr., 703 State St., Hart, Mich. 49420; David W. Hansen, 206 Nanagosa Trail, Suttons Bay, Mich. 49682

[21] Appl. No.: 229,762
[22] Filed: Apr. 19, 1994
[51] Int. Cl.⁶ .............................. B62B 19/02
[52] U.S. Cl. ........................... 280/10; 280/9; 280/33.992
[58] Field of Search ............... 280/33.992, 8, 9, 7.12, 280/10, 11, 7.14

[56] References Cited

U.S. PATENT DOCUMENTS

| | | | |
|---|---|---|---|
| 659,560 | 10/1900 | Tietjen | 280/7.12 |
| 773,959 | 11/1904 | Meissner | 280/7.12 |
| 3,463,502 | 8/1969 | Gough | 280/8 |
| 4,040,638 | 8/1977 | Flagg | 280/9 |
| 4,320,904 | 3/1982 | Walters et al. | 280/9 |
| 4,832,575 | 5/1989 | Crew | 280/8 |

*Primary Examiner*—Margaret A. Focarino
*Assistant Examiner*—Carla Mattix
*Attorney, Agent, or Firm*—Waters & Morse

[57] ABSTRACT

A skid attachment for a carrying cart has an arcuate cross-section engageable with a pair of wheels at the front of the cart, and is held in position by the engagement of an edge of the attachment with the underside of the frame of the cart as forward motion of the cart is begun. The wheels rotate about the inner periphery of the attachment during this preliminary movement, in which the attachment simply rolls along the ground a few inches until the contact with the frame is made.

7 Claims, 1 Drawing Sheet

U.S. Patent      Aug. 15, 1995      5,441,285
FIG.-1
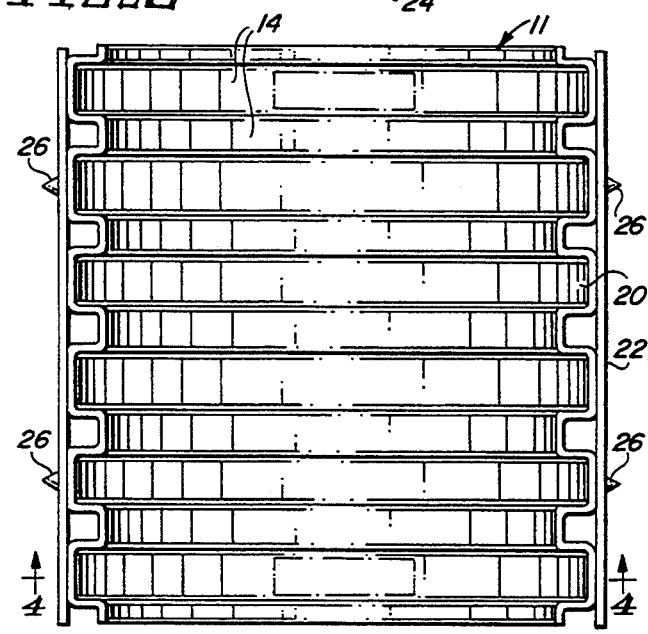
FIG.-3
FIG.-4
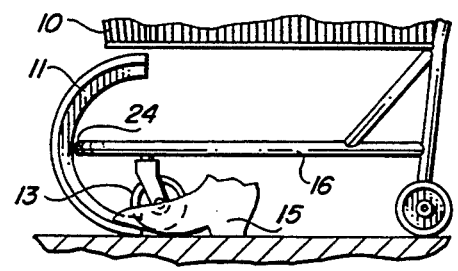
FIG.-2A
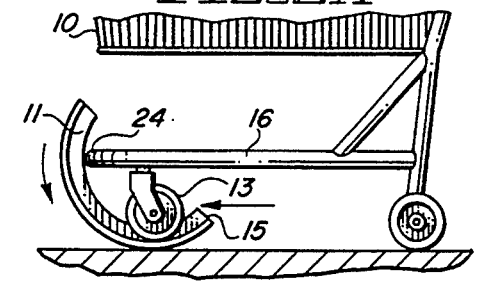
FIG.-2B
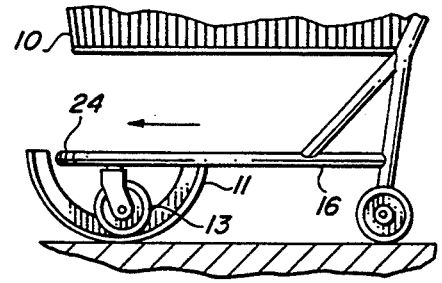
FIG.-2C
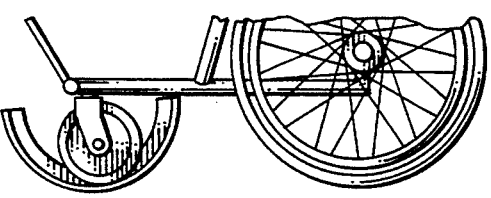
FIG.-5
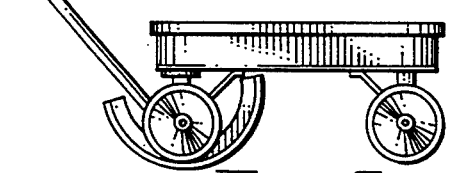
FIG.-6
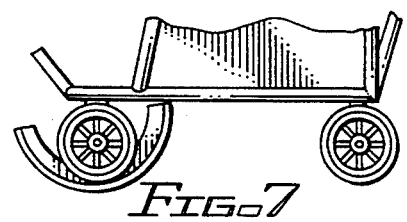
FIG.-7

SLED ATTACHMENT FOR A CONVENTIONAL CARRYING CART

RELATED FIELD

This invention relates to removable sled attachments for load-carrying carts.

BACKGROUND OF THE INVENTION

Anyone who has had the experience of pushing a loaded shopping cart through the snow, ice, and slush of a supermarket parking lot in the winter will appreciate the convenience of converting the resistance of the entrapped wheels to the free sliding movement of a toboggan. Several previous developments have accomplished this with varying degrees of success. A permanent conversion from wheels to skids produces a different problem, which is the difficulty of pushing the cart over the exposed concrete areas. The solution seems to be in the development of some sort of attachment that is easily and quickly put in place and later removed. Cost, of course, is a major factor, and any device and its related equipment must not interfere with the end-for-end stacking common for shopping carts. Similar problems are involved with two-wheeled freight dollies.

SUMMARY OF THE INVENTION

This invention provides a preferably semi-cylindrical skid plate or sled attachment under the front wheels of a carrying cart. The engagement of at least one of the wheels with a peripheral groove in the sled makes the sled self-securing as it rolls slightly along the ground when the wheels are pushed over the edge of the sled when it is in a preliminary position. Continued forward movement of the cart causes the sled to roll along the ground under the wheels until an edge comes into contact with the frame of the cart. At this point, the rolling of the sled stops, and it then functions as a toboggan. The cart can be backed off the sled, and the sled stored on a lower shelf of the cart until it is needed again. No fastenings or other added structure are needed on the standard cart. The sled can be made by cutting a length of plastic tube or pipe along a diametral plane.

DESCRIPTION OF THE DRAWINGS

FIG. 1 is a perspective view showing the skid attachment fully engaged with a conventional shopping cart, with an optional cover member being shown partially broken away.

FIG. 2A is a side elevation showing a preliminary position in the installation of the skid attachment, with the foot of the operator pressing the rear edge of the attachment down sufficiently to accept the front wheels of the cart.

FIG. 2B shows an intermediate position in the engagement of the skid attachment.

FIG. 2C shows the fully installed position of the skid attachment.

FIG. 3 is a top view showing the preferred form of the skid attachment.

FIG. 4 is a side elevation showing the skid attachment.

FIG. 5 shows a side elevation of the skid attachment installed on a different type of cart.

FIG. 6 is a side elevation showing the device installed on a standard child's cart, which is frequently used for hauling miscellaneous objects.

FIG. 7 is a side elevation showing the device installed on a four-wheeled cart similar to a child's stroller.

DESCRIPTION OF THE PREFERRED EMBODIMENT

The conventional shopping cart 10 is shown in FIG. 1 equipped with the skid plate or sled attachment 11. The opposite castering wheels 12 and 13 at the front of the cart are shown riding within the attachment 11 directly above the point of lower tangency of the wheels, which is the position at which the load from the cart is transferred through the attachment to the ground. One of the wheels should be engaged with one of the several grooves 14 (refer to FIG. 3) of the skid attachment. The attachment itself is preferably a piece of cylindrical plastic tube or pipe 20 with corrugated side walls that has been cut along a diametral plane to provide semi-circular pieces. It is preferred that the configuration of the tube be such that both front wheels are received in the grooves 14. The pipe 20 con be covered with a flat sheet of plastic 22 to provide a smooth outer surface. This makes the sled slide more easily over the snow.

The installation of the attachment is illustrated in FIG. 2. The attachment 11 is placed on the ground across in front of the cart, and the edge 15 is depressed by the foot of the user of the cart. The cart is then rolled forward so that the wheels 12 and 13 climb over the edge 15, and begin to ride on the internal surface of the attachment. The sled is shaped such that the front end 24 of the cart engages the interior of the cylindrical sled attachment as the wheels of the cart have rolled on the front edge of the sled. The engagement of the front end of the cart with the attachment urges the attachment to pivot under the wheels as the cart rolls onto the sled. Studs 26 can be mounted on the front and rear edges of the attachment so that the sled stays in position on the ground and does not slide forwardly as the cart is pushed onto the sled. Forward movement of the cart is continued until the attachment 11 rolls along the ground to the point that the edge 15 contacts the underside of the frame 16 of the cart (FIG. 2C). At this point, the attachment is fully engaged with the cart, and further forward motion causes the attachment 11 to skid along the ground like a toboggan, presenting its full undersurface for the support of the load in the cart. If desired, an elastic rubber strap 28 (FIG. 1) can be connected between the cart and an opening 30 in the edge of the sled in order to hold the sled on the cart and prevent the cart from rolling off the sled when the cart is pulled rearwardly. The strap can be wrapped around the cart in any desired manner to secure the sled to the cart. The entrapment of the rear wheels in snow and slush is easily eliminated by slightly lifting on the handle of the cart so that the load is entirely carried by the skid attachment.

Removal of the attachment is simply the reverse of the installation. If the sled has been strapped to the cart, the strap is first removed. Then the cart is pulled backward. As this occurs, the attachment rolls along the ground and rotates in a clockwise direction (as viewed in FIG. 4) until the wheels move off over the edge 15. The attachment can then be placed for storage on probably the lower rack of the shopping cart.

FIGS. 5, 6, and 7 illustrate the application of the invention to various forms of commonly-used carts. In FIG. 5, a cart similar in configuration to a wheelchair can be equipped with the skid attachment on the front wheels, so that someone pushing the chair would be able to maneuver it over very adverse ground conditions by applying a slight lifting action enough to take most of the load off the rear wheels. In FIG. 6, the attachment is shown installed on a cart similar to that used by children in their play, but which is occasionally drafted into special use for hauling various objects. In FIG. 7, the device is shown attached to a cart similar to a stroller in which a slight lifting action on the handle will transfer the weight of the device over to the skid attachment, in the same manner as that referred to in FIG. 5.

I claim:

1. A sled attachment for a conventional shopping cart having two front wheels and two rear wheels connected by a frame, with the frame being above the lowermost portion of and behind the front wheels, the sled attachment comprising:

a panel having an arcuate cross-section extending over a sector of substantially less than 360 degrees, and adapted to receive at least one of said wheels within said cross-section, the panel being wider than the distance between the front wheels, the panel having a rear edge that can be pivoted downwardly to roll the front wheels on the panel, the rear edge pivoting upwardly as the front wheels are thereafter rolled forwardly on the panel until the rear edge of the panel engages the frame, the frame restraining further upward pivotal movement of the panel rear edge, the arcuate length of the panel being such that when the rear edge of the panel contacts the frame a front edge of the panel extends upwardly in front of the front wheels so as to urge the cart to slide over snow in front of the cart when the cart is pushed forwardly.

2. A sled attachment as defined in claim 1, wherein said arcuate cross-section is in the form of a semi-circle.

3. A sled attachment as defined in claim 1, wherein said panel has at least one peripheral groove disposed to receive said wheel.

4. A sled attachment as defined in claim 1 wherein the panel comprises an arcuate section of a hollow round tube having a corrugated sidewall.

5. A sled attachment as claimed in claim 4 wherein the tube with corregated sidewall is covered with a flat plastic sheet.

6. A sled attachment as defined in claim 1 wherein the panel includes outwardly extending studs adjacent an edge of the panel such that the studs restrain the sled from sliding forwardly as the cart is rolled on the sled over an edge of the sled.

7. A sled attachment for a cart having front and rear wheels mounted on a frame, with the frame extending rearwardly from the front to the rear wheels at a position above a lowermost position of the wheels, the sled attachment comprising a panel having a transverse axial length greater than the distance between the front wheels, the panel extending under the front wheels and having an upwardly extending rear edge and an upwardly extending front edge, the panel being rotatable rearwardly so that the front wheels can be rolled over the rear edge of the panel and onto the panel, the panel rocking forwardly as the cart wheels roll forwardly on the panel, the rear edge of the panel being constructed such that the rear edge of the panel engages the frame after the rear edge has rocked upwardly a predetermined distance, the frame restricting further upward movement of the rear edge of the panel as the cart moves forwardly, the front edge of the panel extending upwardly in front of the front wheels when the rear edge of the panel engages the frame so as to prevent the front wheels from rolling off the front edge of the panel and so as to deflect snow downwardly and under the panel as the cart is pushed over snow-covered ground.

* * * * *